(12) United States Patent
Brokvist et al.

(10) Patent No.: US 9,560,658 B2
(45) Date of Patent: Jan. 31, 2017

(54) METHOD FOR TRANSMISSION OF BACKHAUL DATA IN WIRELESS 238COMMUNICATION SYSTEMS

(71) Applicant: HUAWEI TECHNOLOGIES CO., LTD., Shenzhen, Guangdong (CN)

(72) Inventors: Tord Brokvist, Kista (SE); Arne Lundbäck, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 14/339,847

(22) Filed: Jul. 24, 2014

(65) Prior Publication Data

US 2014/0334307 A1 Nov. 13, 2014

Related U.S. Application Data

(63) Continuation of application No. PCT/EP2012/051054, filed on Jan. 24, 2012.

(51) Int. Cl.
*H04L 1/00* (2006.01)
*H04W 72/04* (2009.01)
*H04B 1/74* (2006.01)

(52) U.S. Cl.
CPC ........... *H04W 72/0486* (2013.01); *H04B 1/74* (2013.01)

(58) Field of Classification Search
CPC ..................... H04J 2203/006; H04J 2203/007; H04J 3/14; H04J 3/15; H04J 3/16; H04J 3/17; H04J 3/18; H04L 47/10; H04L 47/11; H04L 47/12; H04L 47/13; H04L 47/14
USPC ................ 370/216–235, 244, 242, 450, 454, 522,370/395.2, 247–253
See application file for complete search history.

(56) References Cited

U.S. PATENT DOCUMENTS

| 7,835,272 B1 * | 11/2010 | Johnson .............. H04L 41/0668 370/228 |
| 2003/0134643 A1 | 7/2003 | Pedziwiatr et al. |
| 2012/0327801 A1 * | 12/2012 | Seo .......................... H04B 1/74 370/252 |

FOREIGN PATENT DOCUMENTS

| CN | 1613232 | 5/2005 |
| EP | 2 451 211 A1 | 5/2012 |
| WO | WO 2011/000306 A1 | 1/2011 |
| WO | WO 2011/112017 A2 | 9/2011 |

OTHER PUBLICATIONS

Chinese Office Action dated Mar. 13, 2015 in corresponding Chinese Patent Application No. 201280067777.9.
International Search Report issued on Oct. 17, 2012 in corresponding International Patent Application No. PCT/EP2012/051054.
Chia, et al., "The Next Challenge for Cellular Networks: Backhaul", IEEE Microwave Magazine, Aug. 2009, p. 54-66.

* cited by examiner

Primary Examiner — Dady Chery
(74) Attorney, Agent, or Firm — Staas & Halsey LLP

(57) ABSTRACT

A wireless communication system using radio resources for transmission of backhaul data between one or more mobile stations and at least one network control node, a first backhaul transmission link (L_1) being used for transmission of backhaul data and at least one second backhaul transmission link (L_2) being used for transmission of backhaul data. The first backhaul transmission link (L_1) operates as a main backhaul transmission link and the second backhaul transmission link (L_2) operates as an auxiliary backhaul transmission link, and the second backhaul transmission link (L_2) uses at least a part of the radio resources for transmission of backhaul data when in operation.

12 Claims, 3 Drawing Sheets

METHOD FOR TRANSMISSION OF BACKHAUL DATA IN WIRELESS 238COMMUNICATION SYSTEMS

CROSS-REFERENCE TO RELATED APPLICATIONS

This application is a continuation of International Application No. PCT/EP2012/051054, filed on Jan. 24, 2012, which is hereby incorporated by reference in its entirety.

TECHNICAL FIELD

The present invention relates to a method for transmission of backhaul data in wireless communication systems. Furthermore, the invention also relates to a wireless communication system adapted for such transmissions, a control device, a computer program, and a computer program product thereof.

BACKGROUND OF THE INVENTION

Wireless communication systems, such as LTE, WCDMA and WiMAX use a mobile backhaul system for transfer of data between different edge network nodes or between edge network nodes and aggregating nodes higher up in the topological hierarchy of the system. The mobile backhaul is the transmission network connecting base stations to other base stations and other high level nodes in the system like e.g. controllers, gateways, core nodes, etc.

Known communication techniques for transfer of backhaul data is e.g. Ethernet, Plesiochronous Digital Hierarchy (PDH) and (Synchronous Digital Hierarchy) SDH on copper, microwave or fiber. Alternative low cost techniques are e.g. WiFi, ADSL, and Free Space Optics. These low cost techniques are generally considered as unreliable meaning that their offered performance varies depending on external factors like weather conditions, line of sight blocking conditions and interference from external sources, etc.

The problem with unreliable backhauls is that neither capacity nor quality can be guaranteed over time. Therefore, unreliable backhauls are not accepted for mobile backhauling due to the lack of robustness. However, because of the growing interest in deployment of small (low cost) base stations, a need for a likewise low cost backhaul appears. Currently available low cost backhauls do not fulfill the reliability requirements for the mobile backhaul.

SUMMARY OF THE INVENTION

An object of the present invention is to provide a solution which mitigates or solves the drawbacks of prior art backhaul solutions. Especially, to provide a low cost backhaul solution which will support the requirements needed in mobile backhauling.

According to a first aspect of the invention, the above mentioned objects are achieved by a method for transmission of backhaul data in a wireless communication system, said wireless communication system being adapted to use radio resources for transmission between one or more mobile stations and at least one network control node, said method comprising: using a first backhaul transmission link ($L_1$) for transmission of backhaul data and using a second backhaul transmission link ($L_2$) for transmission of backhaul data, wherein:

said first backhaul transmission link ($L_1$) operates as a main backhaul transmission link and said second backhaul transmission link ($L_2$) operates as an auxiliary backhaul transmission link, and said second backhaul transmission link ($L_2$) uses at least a part of said radio resources for transmission of backhaul data when in operation.

Embodiments of the method above are defined in the appended dependent claims. Further, the above mentioned method may also be executed in a computer and comprised in suitable computer programs and computer program products.

According to a second aspect of the invention, the above mentioned objects are achieved with a wireless communication system being adapted to use radio resources for transmission between one or more mobile stations and at least one network control node, said wireless communication system further being adapted to: use a first backhaul transmission link ($L_1$) for transmission of backhaul data and use a second backhaul transmission link ($L_2$) for transmission of backhaul data, wherein:

said first backhaul transmission link ($L_1$) operates as a main backhaul transmission link and said second backhaul transmission link ($L_2$) operates as an auxiliary backhaul transmission link, and said second backhaul transmission link ($L_2$) uses at least a part of said radio resources for transmission of backhaul data when in operation.

According to a third aspect of the invention, the above mentioned objects are achieved with control device for controlling backhaul transmission in a wireless communication system as defined above, wherein said control device comprises:

monitoring means for monitoring a first operating transmission capacity $C_1$ or at least one quality parameter for said first backhaul transmission link ($L_1$); and control means for allowing parallel transmissions of backhaul data on said first ($L_1$) and second ($L_2$) backhaul transmission links, respectively.

The present invention provides a robust and cost effective solution for transmission of backhaul data in a wireless communication system since the invention employs a main link ($L_1$) and at least one auxiliary link ($L_2$) which may be used in parallel with the main link.

Moreover, the invention also enables the use of only one access point address in the network control node, and can also work when so called data altering functionality is active, e.g. application of a cryptographic algorithm on the level of first ($L_1$) and second ($L_2$) links or on the level of the unified backhaul resource, i.e. the access point level.

Further applications and advantageous of the invention will be apparent from the following detailed description.

BRIEF DESCRIPTION OF THE DRAWINGS

The appended drawings are intended to clarify and explain different embodiments of the present invention in which.

DETAILED DESCRIPTION OF THE INVENTION

Figure 1:
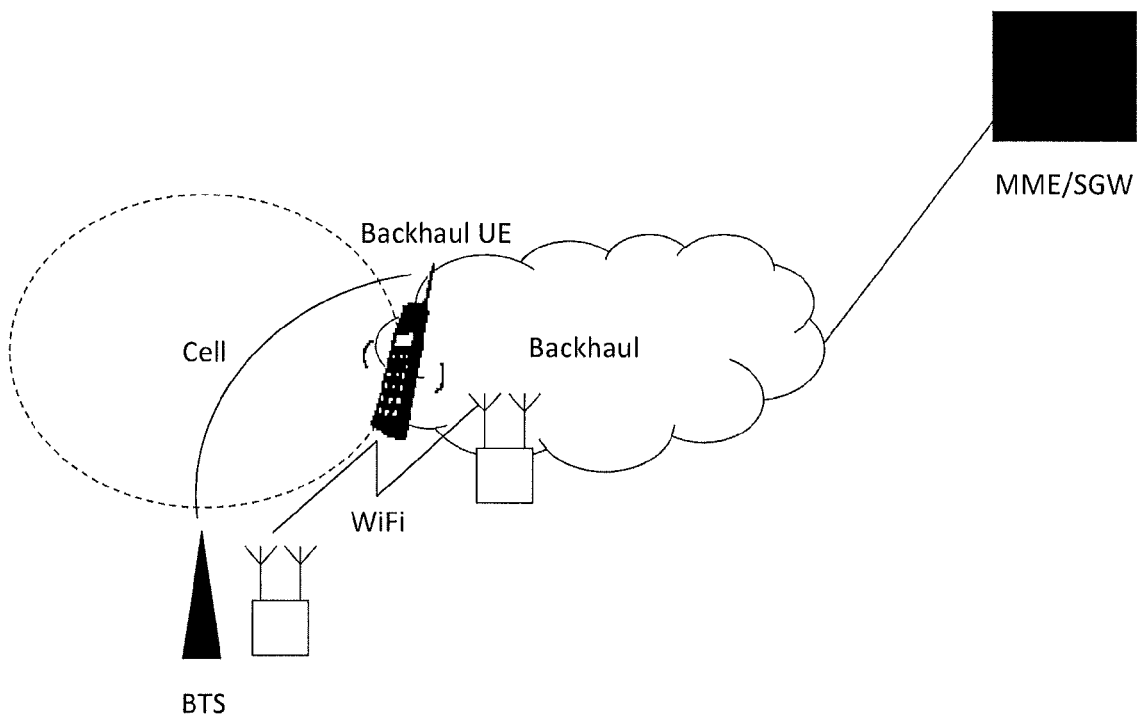
FIG. 1 shows an overview of unreliable backhaul combined with self-backhaul.

To achieve the aforementioned and other objects the present invention relates to a method for transmission of backhaul data in a wireless communication system. The wireless communication system is of the type which uses radio resources for transmission between one or more mobile stations and at least one network control node, such as a base station or a relay node. The radio resources are in this context the radio frequencies allocated for e.g. LTE, LTE Advanced, WCDMA, or WiMAX. These frequencies are well known to the skilled person.

A general idea of the present invention is to use a first $L_1$ and at least one second backhaul transmission link $L_2$ for transmission of backhaul data. The relationship between the first and second links is such that the first backhaul transmission link operates as a main backhaul transmission link while the second backhaul transmission link operates as an auxiliary backhaul transmission link, and wherein the second backhaul transmission link uses at least a part of the radio resources of the wireless communication system when in operation. It should be noted that more than one auxiliary link may be used and the common feature of these auxiliary links is that they all use at least a part of the radio resources when in operation. Further, the one or more auxiliary links may use radio resources which are fully within the frequency bands used by the wireless communication system for communication to the mobile stations.

Therefore, the invention is based on combining two different kinds of backhauls in an innovative way based on their complementing characteristics which also has a relation in (real) time. The real time synergy between these two bearer services is that when the unreliable backhaul is working poorly there will be free capacity in the cell that could be used for self-backhauling. None of the discussed bearer services is good enough on its own but thanks to their complementing characteristics they can offer an acceptable service level when used in combination. A problem with the unreliable backhaul is that it can't be trusted to always offer full service, and a problem with the self-backhaul is that it consumes cell resources that could have been used for end-user traffic to e.g. mobile stations in the system.

Consequently, the invention provides a solution in which the first link uses "unreliable backhaul" while the second link uses "reliable backhaul". Unreliable backhaul can in this context be understood as a backhaul transmission link which uses communication resources other than the radio resources used by the wireless communication system for communication to or from one or mobile stations in that system. Examples of such communication resources well suited for use with the present invention is one or more in the group comprising: WiFi radio frequencies, microwave radio frequencies (including satellite communication frequencies), optical communication frequencies, and power line communication resources.

The unreliable backhaul should be regarded as the family naming of all unreliable backhauls used to access the backhaul of the communication system. One example of such an unreliable backhaul is as mentioned above the WiFi technique which operates in the higher frequencies 2.4 GHz and 5 GHz, and therefore becomes sensitive to blocking of line of sight. Furthermore, these bands are not licensed which means that WiFi could suffer from interference from other equipment in the near surrounding. Another characteristic of such an unreliable backhaul is that it has a relation to the load on the cells of the base station. There is a proportional relation between the throughput of the unreliable backhaul and the amount of radio resources that is allocated for payload use.

Self-backhauling, i.e. using the air interface of the wireless communication system for backhaul is considered a reality. It will meet many of the requirements for a general backhaul, but suffers in the area of cost and capacity. Self-backhauling means using a part of the cell capacity for backhauling. However, using self-backhauling will jeopardize the cell capacity available for mobile stations in the system. How the first and the second links work together can vary according to different embodiments of the invention which will be apparent from the following disclosure.

According to an embodiment of the invention the first link has a first operating transmission capacity $C_1$ while the second link has a second operating transmission capacity $C_2$, and the second link is used if the first operating transmission capacity $C_1$ is less than a threshold operating backhaul transmission capacity value $C_T$. Hence, parameter $C_T$ can be understood as a design parameter for deciding "how much" the respective first and second links should be used. The threshold capacity parameter $C_T$ may also be combined with a further design parameter, i.e. a threshold time period parameter $T_T$. So, according to this embodiment the auxiliary link(s) is used if the first operating transmission capacity $C_1$ is less than the threshold operating backhaul transmission capacity $C_T$ during a threshold time period $T_T$.

A further study also reveals that the first backhaul transmission link ($L_1$) has a maximum (operating) capacity $C_{Max}$ which depends on the specific configuration of that link. Mentioned parameters $C_T$ and $T_T$ may preferably be related such that the at least one second backhaul transmission link $L_2$ is used if:
 the threshold time period $T_T$ has a value in the interval of 1-60 s, and preferably in the interval of 5-20 s; and
 the threshold operating backhaul transmission capacity $C_T$ has a value in the interval of 10-90%, and preferably in the interval of 40-80% of the maximum capacity $C_{Max}$.

Another consideration regarding the use of the first and second links is the sum capacity of the mentioned links. One option is that the first transmission capacity $C_1$ plus the second operating transmission capacity $C_2$ is substantially equal to the maximum capacity $C_{Max}$, i.e. $C_1+C_2 \approx C_{Max}$, which means that the system strives to provide the maximum backhaul capacity $C_{Max}$. Another option is to let the threshold operating backhaul transmission capacity $C_T$ be substantially equal to the maximum capacity $C_{Max}$ so that the first operating transmission capacity $C_1$ plus the second operating transmission capacity may be larger than the maximum capacity $C_{Max}$, i.e. $C_1+C_2>C_{Max}$. It is also possible that the sum of the capacities is kept below the maximum capacity $C_{Max}$, e.g. if the traffic to the mobile station has to be prioritized. These different control principles may also be combined so that they are applied in different instances in time depending on desired behavior of the backhaul transmission system.

According to another aspect of the invention, the use of the auxiliary link can be based on quality aspects of the main link. Preferably, the system is arranged to use the auxiliary link based one or more quality parameters such as bit error rate, packet error rate, jitter, delay, and other suitable quality parameters. These parameters can be used (e.g. by the control device according to the invention) as threshold parameters for triggering the use of the auxiliary link(s) for backhaul transmission. It should also be noted that according to the present invention, the combination of one or more capacity and quality parameters can be used for controlling the use of the main and auxiliary links. Thus, the first and second links can be controlled based on capacity and/or quality parameters.

It should from the above description further be realized that there are many solutions for making the unreliable (main) backhaul operate in parallel with the (auxiliary) self-backhauling. The control function of the controlling device will ensure that the following requirements/principles may be used when controlling the main and auxiliary link(s):

Self-Backhaul (auxiliary link) shall only be used when the unreliable backhaul (main link) is degraded;
Unreliable and self-backhaul shall be able to run in parallel;
Unreliable backhaul shall be used as extensively as possible at every single moment;
It shall be possible to select how much capacity to reserve for the self-backhaul depending on current operating service level of the unreliable backhaul;
Support use of only one IP-address in the network control node (base station) accessing the backhaul;
Support use of IPsec all the way to the network control node;
Secure that the frames arrive in consecutive order.

Except from committing to the above listed requirements the invention makes it possible to solve the following problems: use of IPsec tunnels causes the IP-header to be encrypted and it will not be possible to detect which flow the received uplink traffic belongs to. Still all frames must arrive in consecutive order;

Enabling use of one single IP-address requires that flows are split on a level below IP before entering the parallel backhauling techniques (seen as links from the IP-level) and merged when leaving. All this must be made without disordering the frames.

Parallel usage of unreliable backhaul and self-backhauling would in the example given below in theory ensure full down-link cell capacity as long as the unreliable backhaul is providing more than 50% of its maximum bandwidth.

Figure 2:
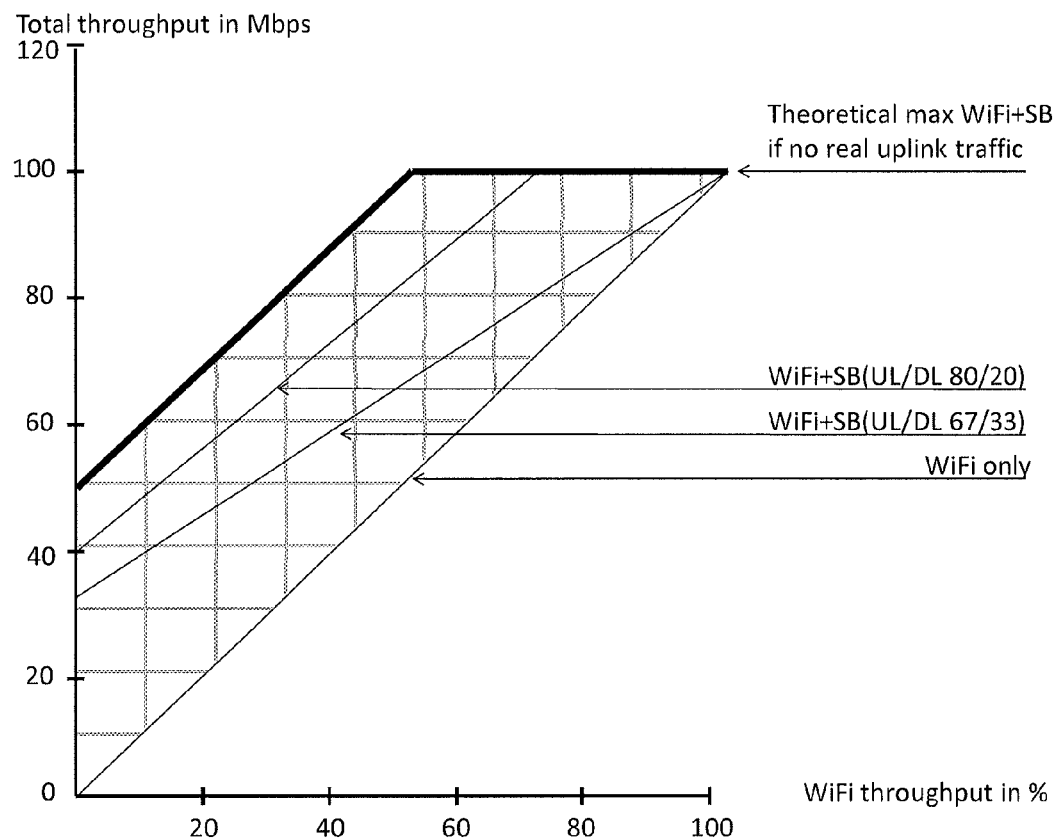
FIG. 2 illustrates the benefit of self-backhauling depending on WiFi service level.

The following example visualizes the benefits of the present invention (note that the unreliable backhaul is represented by WiFi) where the DL benefit from using self-backhauling in parallel with WiFi according to the assumptions above is described in FIG. 2:

The base station is equipped with one 20 MHz carrier component offering DL/UL 100/50 Mbps. In the graph in FIG. 2 the two thin lines labeled WiFi+SB represent one example each. The line labeled WiFi+SB 67/33 is based on the assumption that the ratio between used DL/UL is the same as the available ratio in the air interface (100/50). The line labeled WiFi+SB 80/20 in the figure below is based on the assumption that the ratio between used DL/UL is 80/20 (according to an operator in Sweden). The WiFi max bandwidth is 100 Mbps UL and DL in this example;
On the other hand if it is assumed that no real UL traffic the contribution from self-backhauling is always 50 Mbps for real DL traffic. This is displayed as the bold line in the FIG. 2.

Furthermore, as understood by the person skilled in the art, any method according to the present invention may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The invention also relates to a wireless communication system and a control device for such a system. The wireless communication system according to the invention is adapted to use radio resources for transmission between one or more mobile stations and at least one network control node. Further, the system is arranged to use a first $L_1$ and a second $L_2$ backhaul transmission link, where the first link operates as a main backhaul transmission link and the second link operates as an auxiliary backhaul transmission link to the first link. As explained above, the second link uses at least a part of the radio resources used by the system when in operation.

Moreover, the control device according to the invention is arranged for controlling backhaul transmission in such a wireless communication system. The control device comprise monitoring means for monitoring a first operating transmission capacity $C_1$ of the first link $L_1$; and a control means for allowing parallel transmissions of backhaul data on the first $L_1$ and second $L_2$ links, respectively. It should be noted that the control device may be modified to control all aspect of the present.

According to an exemplary embodiment of the invention the control device comprises:

Means for monitoring the service level of the unreliable backhaul (auxiliary);
Means (logic) for deciding when support from self-backhauling (main) is needed and to what degree and when support is no longer needed;
Means (logic) for controlling access technology with maintained frame-order,
frame numbering and de-multiplexing frames on to the two different bearer services,
frame reordering and multiplexing.

Means For Monitoring the Service Level of the Unreliable Backhaul

This means is supposed to be available in the terminating function for the unreliable backhaul, for access by either a signaling link or an API depending on realization.

Logic For Deciding When Self-Backhaul Support Is Needed and to What Degree

Figure 3:
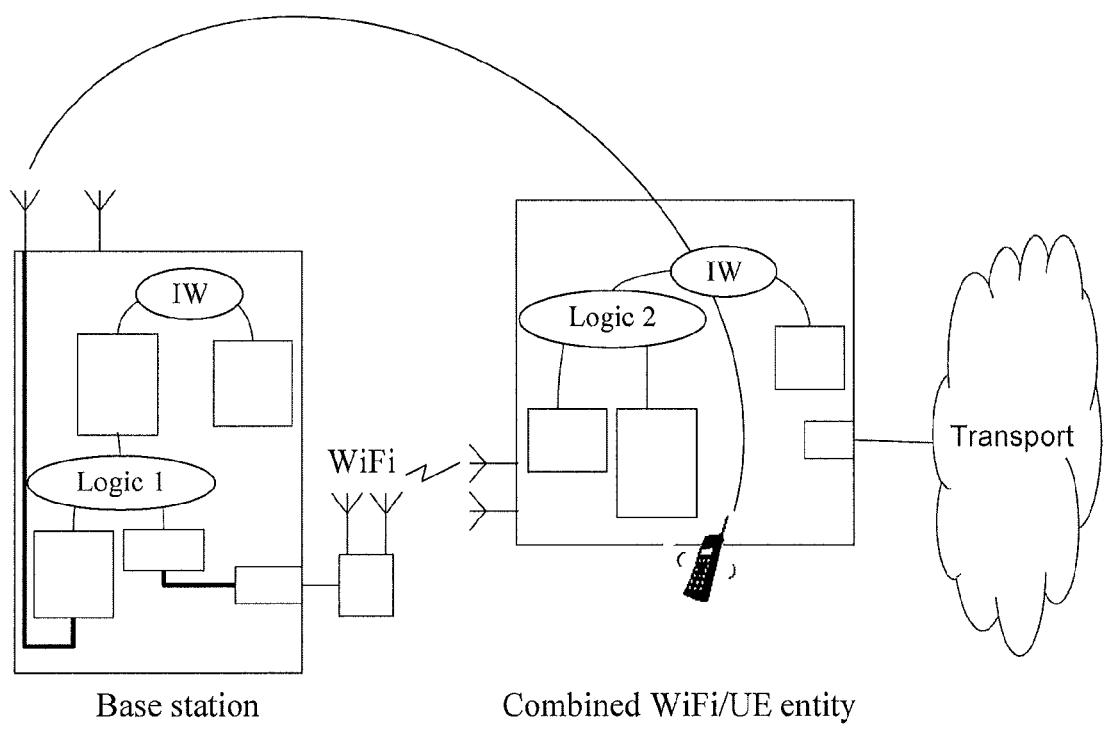
FIG. 3 shows a simple graphical overview of logic needed for the implementation of the present invention.

The logics (located in both Logic 1 and Logic 2 in FIG. 3) make sure that a partition of the traffic is sent over the self-backhaul in case of low service level from the unreliable backhaul. When the unreliable backhaul service level has been below a certain value for a certain time a certain partition of the traffic shall be moved to the self-backhaul, and vice versa when the unreliable backhaul service level improves. The percentage of the traffic to send over the self-backhaul and the unreliable backhaul and at what duration and service level of the unreliable backhaul can be configurable. How to configure is mainly depending on how good supervision of the unreliable backhaul that is supported.

Activation/deactivation of the up-stream logic for access control (Logic 1 in FIG. 3) shall only take place when the BTS regards that the unreliable backhaul performance is too degraded/recovered. Activation/deactivation of the down-stream logic for access control (Logic 2 in FIG. 3) shall only take place when the combined unreliable backhaul/mobile station (e.g. UE) entity comes to the same conclusion.

Logic For Access Control

This solution for making use of the two bearer services can be supported if the UE and the unreliable backhaul equipment connected to the transport network are cooperating as one entity. Cooperation within the entity can be arranged by either a signaling link or an API depending on the implementation.

Further, on the base station side there is an entity consisting of the base station and the unreliable backhaul equipment interacting by either a signaling link or an API depending on implementation. When the logic is active on the sender side it must give the L2-frames a sequence number that can later enable for the logic on the receiving side to reorder the frames in case they have been received out of sequence.

Sender Logic

The logic (located in both Logic 1 and Logic 2 in FIG. 3) is located in the protocol stack on MAC level and is responsible for providing a native MAC service to upper layer by combining two different transmission links. The provided service assures frame ordering between source and destination upper layer. The means for this is a numbering scheme where each SDU received from upper layer will be pre-pended with a sequence number that is transferred in the MAC frame over the link and removed by the receiving side.

The sender logic for access control is activated/de-activated by the logic deciding when self-backhaul support is needed and to what degree.

The sender logic for access control (active only when needed) is responsible for:
  Deciding on a numbering and prepend it to the received MAC-SDU from upper layer;
  Selecting a target link for the numbered MAC-SDU, create an Ethernet frame and transmit the frame over a selected link;
  Determining percentage of traffic to send on respective bearer service, i.e. first and second links, respectively.

Receiver Logic

The receiver logic (located in both Logic 1 and Logic 2 in FIG. 3) for access control (always active) is responsible for:
  Merging the frames received on the two links into one stream;
  Reordering the frame according to the frame numbering;
  Removing the frame numbering;
  Forwarding of native MAC-SDU to the upper layer of the system.

It should be noted that when the unreliable backhaul becomes "back in full service", the cell will also be "back in full service for real traffic". When the unreliable backhaul is "back in full service" there is no need to use the self-backhaul and thus no cell radio resources will be used for backhauling. Instead all cell radio resources will be used to support end-user terminals (e.g. UEs) and thus the cell will be back in full service.

Finally, it should be understood that the present invention is not limited to the embodiments described above, but also relates to and incorporates all embodiments within the scope of the appended independent claims.

The invention claimed is:

1. A method for transmission of backhaul data in a wireless communication system, the wireless communication system configured to use radio resources for transmission between one or more mobile stations and at least one network control node, the method using a first backhaul transmission link for transmission of backhaul data and using at least one second backhaul transmission link for transmission of backhaul data, wherein:
  the first backhaul transmission link operates as a main backhaul transmission link and the second backhaul transmission link operates as an auxiliary backhaul transmission link, and
  the second backhaul transmission link shares at least a part of the radio resources between the one or more mobile stations and the at least one network control node with the first backhaul transmission link for transmission of backhaul data when in operation.

2. The method according to claim 1, wherein the first backhaul transmission link uses communication resources other than the radio resources.

3. The method according to claim 1, wherein the first and second backhaul transmission links connect the network control node with a backhaul of the wireless communications system.

4. The method according to claim 1, wherein:
  the first backhaul transmission link has a first operating transmission capacity $C_1$ and the second backhaul transmission link has a second operating transmission capacity $C_2$; and
  the second backhaul transmission link is used if the first operating transmission capacity $C_1$ is less than a threshold operating backhaul transmission capacity $C_T$.

5. The method according to claim 4, wherein the second backhaul transmission link is used if the first operating transmission capacity $C_1$ is less than the threshold operating backhaul transmission capacity $C_T$ during a threshold time period $T_T$.

6. The method according to claim 4, wherein the first and second backhaul transmission links are used such that the first operating transmission capacity $C_1$ plus the second operating transmission capacity $C_2$ is substantially equal to the maximum capacity $C_{Max}$, i.e. $C_1+C_2 \approx C_{Max}$.

7. The method according to claim 4, wherein:
  the first backhaul transmission link has a maximum capacity $C_{Max}$, and
  the threshold operating backhaul transmission capacity $C_T$ is substantially equal to the maximum capacity $C_{Max}$ so that the first operating transmission capacity $C_1$ plus the second operating transmission capacity is larger than the maximum capacity $C_{Max}$, i.e. $C_1+C_2 > C_{Max}$.

8. The method according to claim 1, wherein the use of the second backhaul transmission link is based on at least one quality parameter for the first backhaul transmission link.

9. The method according to claim 8, wherein the quality parameter is selected from the group consisting of bit error rate, packet error rate, jitter, and delay.

10. The method according to claim 1, wherein the wireless communication system is a LTE, LTE Advanced, WCDMA, or WiMAX system.

11. A method for transmission of backhaul data in a wireless communication system, the wireless communication system configured to use radio resources for transmission between one or more mobile stations and at least one network control node, the method using a first backhaul transmission link for transmission of backhaul data and using at least one second backhaul transmission link for transmission of backhaul data, wherein:
  the first backhaul transmission link operates as a main backhaul transmission link and the second backhaul transmission link operates as an auxiliary backhaul transmission link, and
  the second backhaul transmission link shares at least a part of the radio resources between the one or more mobile stations and the at least one network control node with the first backhaul transmission link for transmission of backhaul data when in operation, wherein:
the first backhaul transmission link has a first operating transmission capacity $C_1$ and the second backhaul transmission link has a second operating transmission capacity $C_2$; and
the second backhaul transmission link is used if the first operating transmission capacity $C_1$ is less than a threshold operating backhaul transmission capacity $C_T$,
wherein the second backhaul transmission link is used if the first operating transmission capacity $C_1$ is less than the threshold operating backhaul transmission capacity $C_T$ during a threshold time period $T_T$, and
wherein the first backhaul transmission link has a maximum capacity $C_{Max}$, and the second backhaul transmission link is used if:
the threshold time period $T_T$ has a value in the interval of 1-60 s, and preferably in the interval of 5-20 s; and
the threshold operating backhaul transmission capacity $C_T$ has a value in the interval of 10-90%, and preferably in the interval of 40-80% of the maximum capacity $C_{Max}$.

12. A base station for transmission of backhaul data in a wireless communication system, the wireless communication system configured to use radio resources for transmission between one or more mobile stations and at least one network control node, the base station comprising a processor configured to:
use a first backhaul transmission link for transmission of backhaul data and using at least one second backhaul transmission link for transmission of backhaul data, wherein:
the first backhaul transmission link operates as a main backhaul transmission link and the second backhaul transmission link operates as an auxiliary backhaul transmission link, and
the second backhaul transmission link shares at least a part of the radio resources between the one or more mobile stations and the at least one network control node with the first backhaul transmission link for transmission of backhaul data when in operation.

* * * * *

UNITED STATES PATENT AND TRADEMARK OFFICE
CERTIFICATE OF CORRECTION

PATENT NO. : 9,560,658 B2
APPLICATION NO. : 14/339847
DATED : January 31, 2017
INVENTOR(S) : Tord Brokvist et al.

It is certified that error appears in the above-identified patent and that said Letters Patent is hereby corrected as shown below:

On the Title Page

Item (54), Title
After "SYSTEMS" delete "238", therefor.

Signed and Sealed this
Twenty-third Day of May, 2017

Michelle K. Lee
*Director of the United States Patent and Trademark Office*